United States Patent
Uchida (10) Patent No.: US 7,896,640 B2
(45) Date of Patent: Mar. 1, 2011

(54) APPARATUS FOR MOLDING COOKED RICE

(75) Inventor: Junya Uchida, Machida (JP)

(73) Assignee: Kabushiki Kaisha Audio-Technica, Machida-shi, Tokyo (JP)

(*) Notice: Subject to any disclaimer, the term of this patent is extended or adjusted under 35 U.S.C. 154(b) by 0 days.

(21) Appl. No.: 12/588,900

(22) Filed: Nov. 2, 2009

(65) Prior Publication Data
US 2010/0129485 A1    May 27, 2010

(30) Foreign Application Priority Data

Nov. 21, 2008 (JP) ................. 2008-297685

(51) Int. Cl.
*A23P 1/10* (2006.01)
(52) U.S. Cl. ........................................... 425/237
(58) Field of Classification Search ............. 425/237
See application file for complete search history.

(56) References Cited

U.S. PATENT DOCUMENTS

| | | | |
|---|---|---|---|
| 3,550,205 A | * | 12/1970 | Guseman et al. ............. 425/237 |
| 5,073,323 A | * | 12/1991 | McCartney ................... 425/237 |

FOREIGN PATENT DOCUMENTS

| JP | 61-37069 | * | 2/1986 |
|---|---|---|---|
| JP | 61-119149 | * | 6/1986 |
| JP | 61-202665 | * | 9/1986 |
| JP | 2006-197823 | * | 8/2006 |

* cited by examiner

*Primary Examiner* — James Mackey
(74) *Attorney, Agent, or Firm* — Manabu Kanesaka

(57) ABSTRACT

Provided is a cooked rice molding apparatus which ensures that a formed cooked rice product falls while keeping almost the same posture without inclining. Part of a concave molding surface 420 of a forming roller 410 is open toward an end surface of the forming roller 410 and a groove-like guide portion 460 is provided in a pair of supporting panels 450 which support both end surfaces of the forming roller 410, whereby part of cooked rice compressed within the concave molding surface 420 and pushed out of both ends of the concave molding surface 420 is received by a guide portion 460 and part of the rice ball is caused to fall along the guide portion 460.

5 Claims, 9 Drawing Sheets

APPARATUS FOR MOLDING COOKED RICE

CROSS-REFERENCE TO RELATED APPLICATION

The present application is based on, and claims priority from, Japanese Application Serial Number JP2008-297685, filed Nov. 21, 2008, the disclosure of which is hereby incorporated by reference herein in its entirety.

TECHNICAL FIELD

The present invention relates to a cooked rice molding apparatus which automatically produces formed cooked rice products such as rice balls for sushi and, more particularly, to a cooked rice molding apparatus which prevents a formed cooked rice product dropped from a forming section from inclining or changing its direction.

BACKGROUND ART

In food retail shops and sushi-go-round restaurants, dedicated cooked rice molding apparatus are used as devices which mass produce rice balls for hand-rolled sushi. For example, as described in Japanese Patent Application Publication No. 2006-197823, a cooked rice molding apparatus is provided with a forming section which forms the cooked rice supplied from a hopper into prescribed formed cooked rice products while compressing the cooked rice.

Figure 9A:
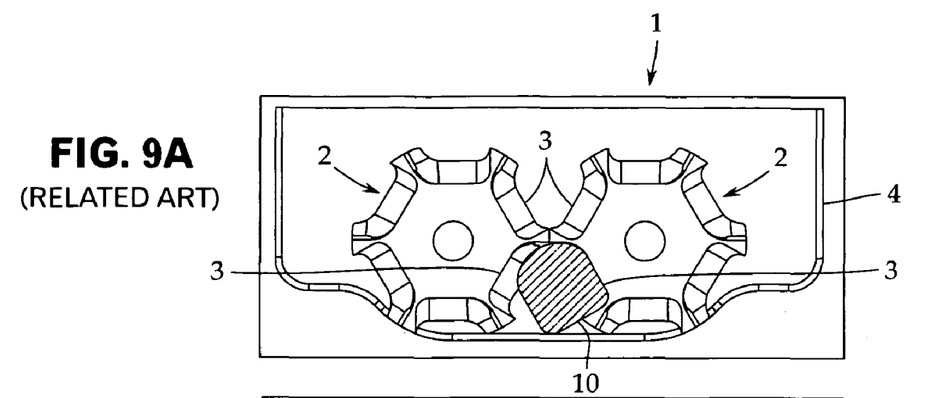
FIGS. 9A to 9C are figures of conventional arts related to the present invention.
Figure 9B:
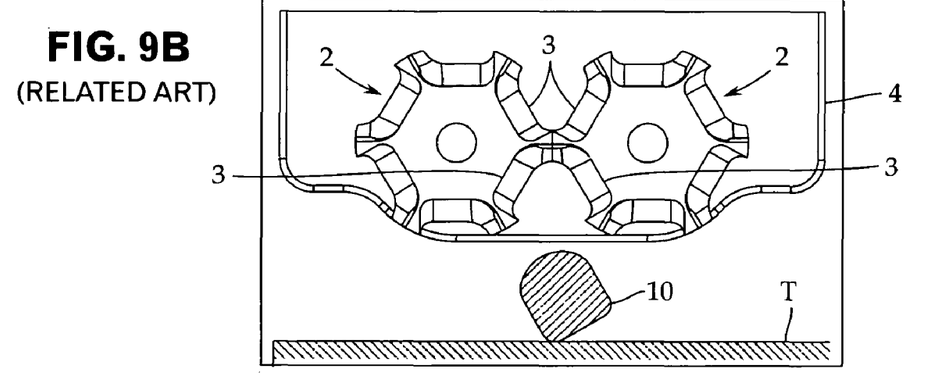
Figure 9C:
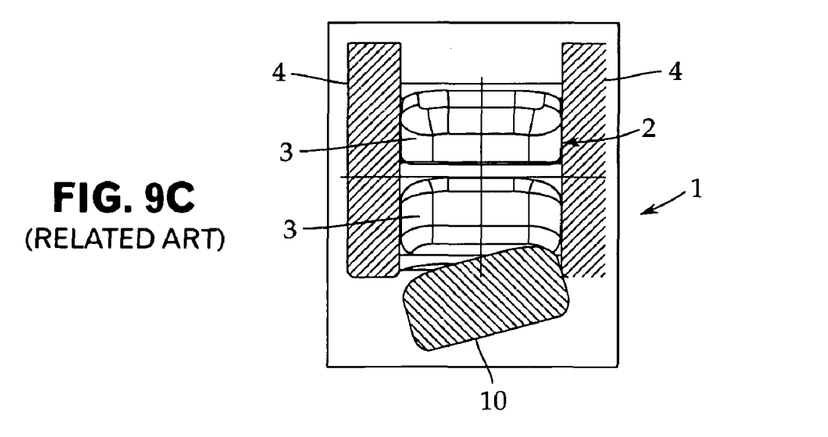

Referring to FIGS. 9A to 9C in combination, a forming section 1 has a pair of forming rollers 2, 2 which rotate in directions opposite to each other around a prescribed horizontal rotary axis, and a pair of supporting panels 4, 4 which support end surfaces of the forming rollers 2, 2. In this forming section 1, sushi rice 10 from the upstream side is fed to between the forming rollers 2, 2, and the sushi rice 10 is sandwiched and compressed with concave molding surfaces 3 formed on outer surfaces of the forming rollers 2, 2, whereby a cylindrical rice ball 10 is released from the downstream side and is caused to fall onto a tray T.

However, this forming method using the forming rollers 2, 2 had problems as described below. That is, in general, sushi rice 10 is very gluey and, therefore, when the sushi rice 10 is sandwiched and compressed with the concave molding surfaces 3 as shown in FIG. 9A, the rice ball 10 sticks to the concave molding surfaces 3, with the result that the rice ball 10 sometimes falls onto a discharge surface T of the tray and a receiving bed in an aslant inclined posture.

Similarly, when the rice ball 10 falls and drops down from the concave molding surfaces 3 as shown in FIGS. 9B and 9C, part of the rice ball 10 comes into contact with part of the supporting panels 4, 4 and becomes slant, with the result that the rice ball 10 sometimes falls aslant onto the discharge surface T.

When the rice ball 10 falls aslant, the rice ball 10 may be deformed and collapse due to the impetus of the fall. Also, when the rice ball 10 rolls on the discharge surface T at the moment of a fall, resulting in a change in position and direction, it is necessary to correct the direction and position of the rice ball 10 in conveying the rice ball 10 to a discharge section to carry out the next step.

Hence, to solve the above-described problems, the present invention has as its object the provision of a cooked rice molding apparatus which ensures that a formed cooked rice product falls while maintaining almost the same posture without inclining.

SUMMARY OF THE INVENTION

To achieve the above-described object, the present invention has some features as described below. In a cooked rice molding apparatus including a forming section which forms cooked rice supplied from a hopper into a formed cooked rice product with a prescribed shape while compressing the cooked rice, the forming section has a pair of forming rollers which rotate in directions opposite to each other around a horizontal rotary axis, there is provided a concave molding surface for forming the formed cooked rice product on an outer circumferential surface of each of the forming rollers, and the cooked rice fed from an upstream side of the forming rollers is compression-formed within the concave molding surface and is discharged as the formed cooked rice product from a downstream side of the forming rollers. In this cooked rice molding apparatus, both ends of the forming roller have a pair of supporting panels, the concave molding surface has, in a potion thereof, a notched portion open toward the end surfaces of the forming roller, and each of the supporting panels is provided with a guide portion into which part of the cooked rice compressed within the concave molding surface and pushed out of the notched portion of the concave molding surface moves and which guides the formed cooked rice product from an upstream side to a downstream side.

According to this feature, part of the supporting panels is provided with a guide portion which receives part of the cooked rice compressed within the concave molding surface and pushed out of the notched portion of the concave molding surface and guides the cooked rice from an upstream side to a downstream side and, therefore, it is possible to cause a formed cooked rice product to fall onto a tray in a right posture without sticking or inclining.

As a more preferred aspect, the guide portion is formed from a guide groove obtained by denting part of the supporting panel, and the guide groove is formed along a vertical axis line passing through abutting surfaces of the forming rollers.

According to this feature, part of the cooked rice compressed within the concave molding surface and pushed out moves into a guide groove and falls along the guide groove, whereby the falling formed cooked rice product is more positively guided.

The guide portion is provided with a fan-shaped first guide groove whose upper-end-side width corresponds to a maximum opening width due to the notched portion between the concave molding surfaces and whose lower-end-side width corresponds to a minimum opening width due to the notched portion between the concave molding surfaces, the widths narrowing from an upstream side to a downstream side, and a second guide groove an end of which is connected to a lower end of the first guide groove and the other end of which is provided in an extending manner toward a lower end of the supporting panel.

According to this feature, the provision of a fan-shaped first guide groove ensures that part of the cooked rice pushed out from the concave molding surface together with the engagement of the concave molding surface is naturally guided to the guide portion and, therefore, it is possible to prevent the cooked rice from moving between the forming rollers and the supporting panels and being mashed up.

The first guide groove and the second guide groove are formed to satisfy $D2>D1$, where $D1$ is the groove depth of the first guide groove and $D2$ is the groove depth of the second guide groove.

Furthermore, the second guide groove is formed to have a depth at which the second guide groove is not in contact with a side surface of the formed cooked rice product.

According to this feature, because the first guide groove and the second guide groove are formed to satisfy D2>D1, where D1 is the groove depth of the first guide groove and D2 is the groove depth of the second guide groove, and because the second guide groove is formed to have a depth at which the second guide groove is not in contact with a side surface of the formed cooked rice product, it is possible to prevent the formed cooked rice product from being caught by part of the supporting panels on the outlet side of the guide groove and losing its shape.

DETAILED DESCRIPTION

An embodiment of the present invention will be described below with reference to the accompanying drawings. However, the present invention is not limited to this embodiment. As shown in FIGS. 1 to 4, this cooked rice molding apparatus 100 is provided with a hopper 200 into which cooked rice 10 (sushi rice) is charged, a compression section 300 which delivers the sushi rice 10 supplied from the hopper 200 while compressing the sushi rice 10, a forming section 400 which forms the compressed sushi rice 10 into a prescribed shape, a conveyance section 500 which conveys the formed cooked rice product (rice ball 10, see FIG. 4) to a prescribed place, and a storage section 600 which temporarily stores the rice ball 10 conveyed from the conveyance section 500.

Figure 3:
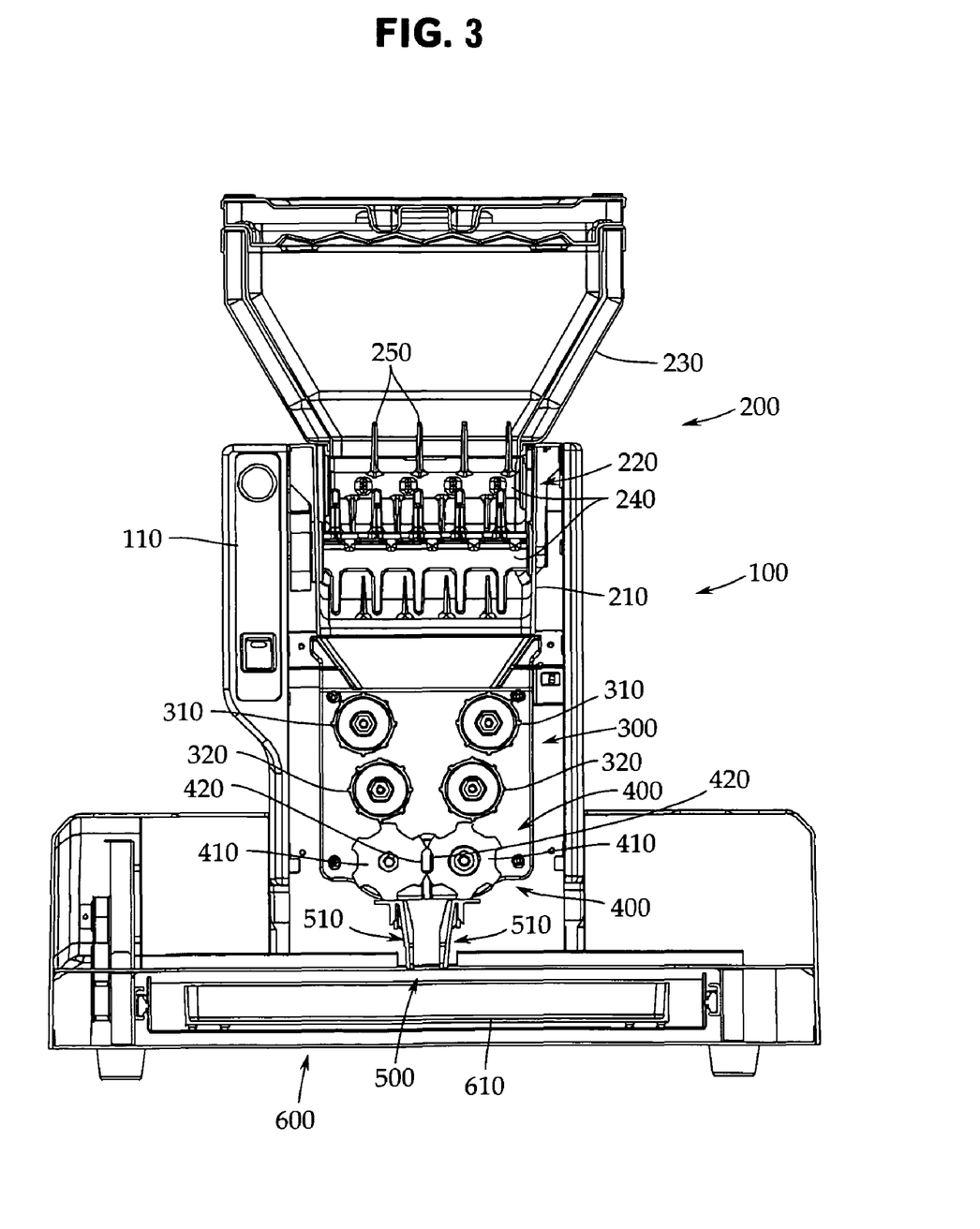
FIG. 3 is a front view showing the internal construction of a food molding apparatus of the present invention.
Figure 4:
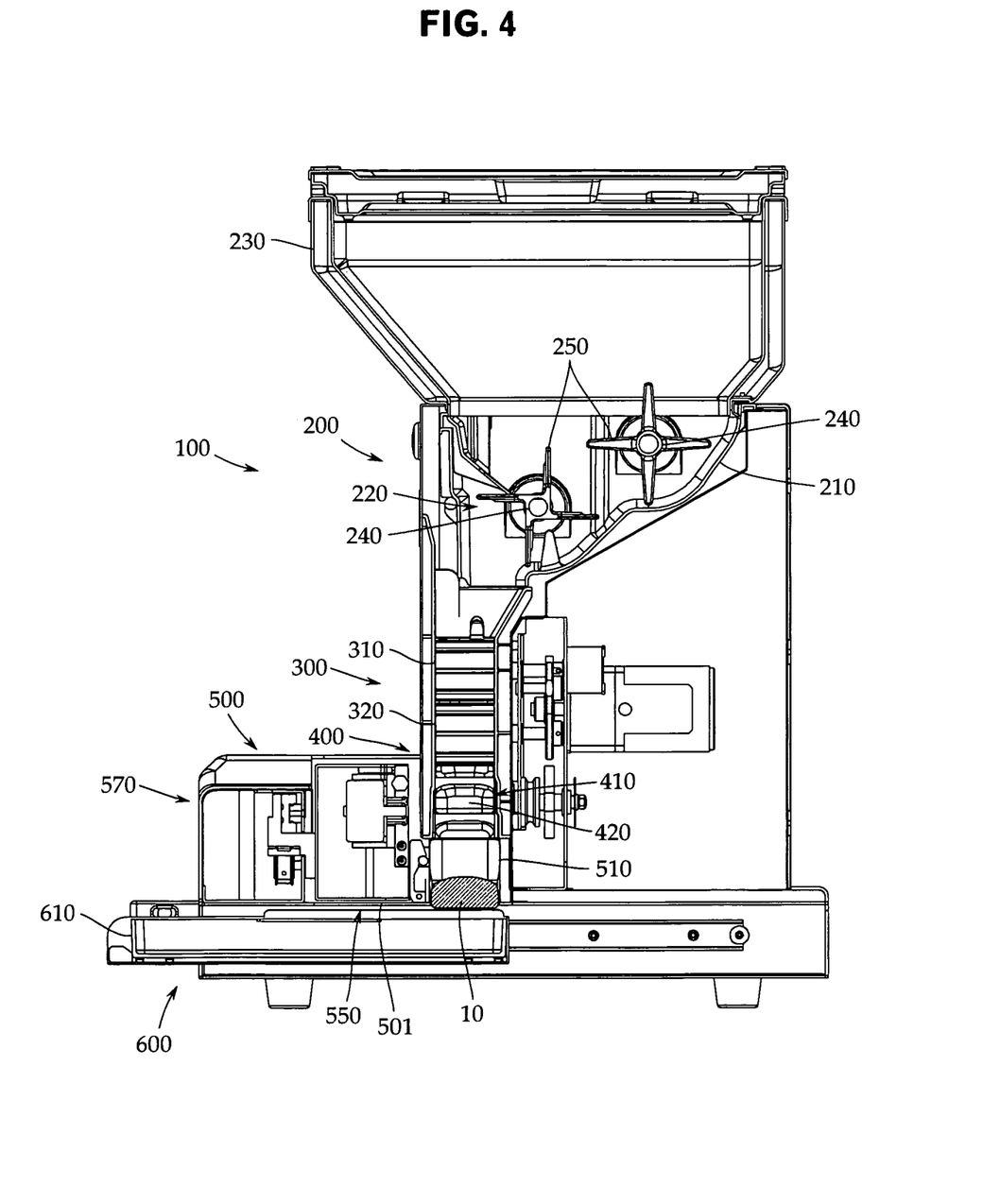
FIG. 4 is a side view showing the internal construction of the food molding apparatus of the present invention.

Incidentally, in this embodiment, the X-axis direction indicates the width direction of the cooked rice molding apparatus 100 (the horizontal direction of FIG. 3), and the Y-direction indicates the depth direction of the cooked rice molding apparatus 100 (the vertical direction of the paper of FIG. 3). The Z-axis direction indicates the vertical direction of the cooked rice molding apparatus 100 (the vertical direction of FIG. 3).

Figure 1:
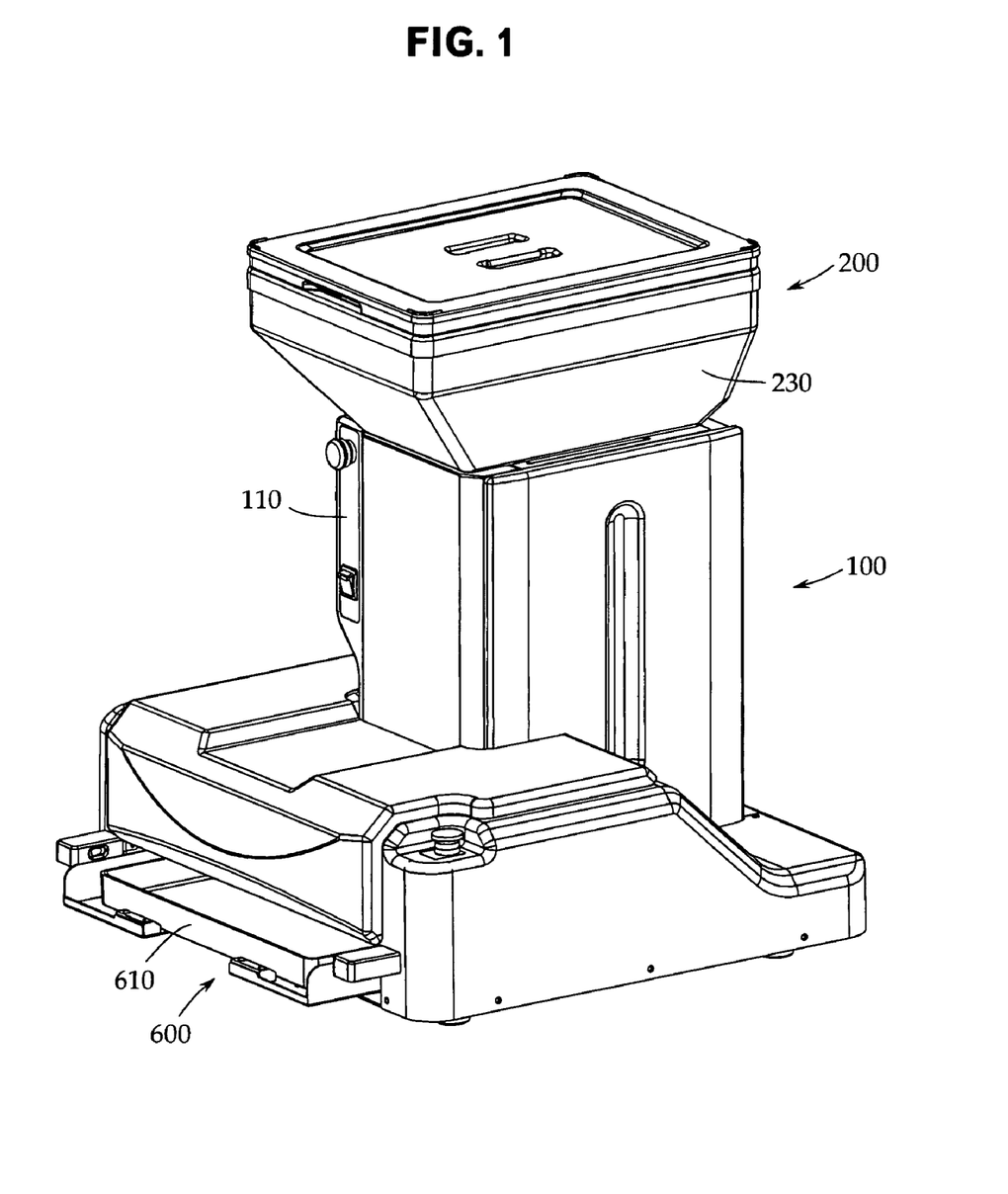
FIG. 1 is a perspective view of a cooked rice molding apparatus in an embodiment of the present invention.
Figure 2:
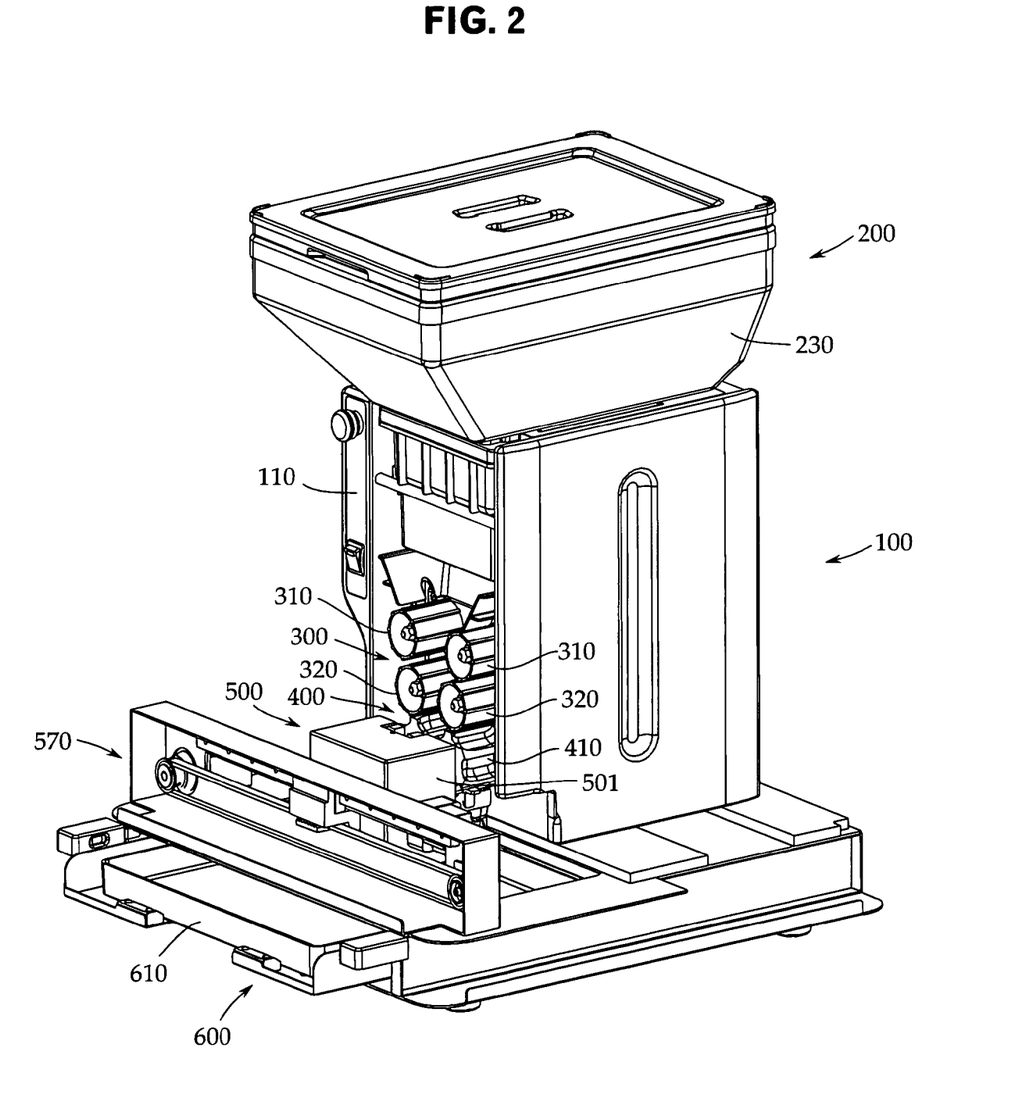
FIG. 2 is a perspective view of the food molding apparatus of FIG. 1 whose cover is removed so that the internal construction can be seen.

As shown in FIG. 1, in ordinary usage, the cooked rice molding apparatus 100 is covered with panels to prevent the entry of dust and these panels are capable of being detached during maintenance, whereby an internal construction as shown in FIG. 2 appears.

On the front surface of the cooked rice molding apparatus 100, there is provided a control panel 110 for operating the cooked rice molding apparatus 100. In this embodiment, the control panel 110 is provided on the upper left-hand part of the front surface and there are arranged various kinds of setting buttons for setting the amount of sushi rice, the number of rice balls 10 to be formed, etc. and a display section as well as a power switch, an emergency stop switch and the like. In the present invention, the configuration of the control panel 110 can be optionally set in accordance with specifications.

The hopper 200 is open toward the upper part of the apparatus main body and is provided with a retaining section 210 in which sushi rice is retained and a stirring section 220 which causes sushi rice to flow forcedly to the downstream side while stirring the sushi rice, and a storage container 230 which supplies sushi rice to the hopper 200 is detachably provided in the upper part of the cooked rice molding apparatus 1.

The retaining section 210 is formed in the shape of a funnel whose volume decreases from the upper to the lower part of the apparatus main body, and the downstream side thereof opens toward a rolling section 300, which will be described later. The stirring section 220 has two stirring arms 240 which are rotatably driven by unshown driving means, and a plurality of stirring rods 250 are attached to each of the stirring arms 240 at prescribed intervals. In FIG. 3, each of the stirring arms 240 rotates rightward (clockwise).

The compression section 300 is a two-high compression section having an upper compression roller pair 310 which is arranged on the outlet side of the hopper 200 and compresses sushi rice supplied from the hopper 200 and a lower compression roller pair 320 which is arranged on the downstream side (delivery side) of the upper compression roller pair 310 and further compresses the sushi rice compressed by the upper compression roller pair 310.

The upper compression roller pair 310 consists of a pair of rollers which rotate around a prescribed horizontal rotary axis (in the vertical direction of the paper in FIG. 3), and the rollers are arranged to be opposed to each other at a prescribed interval. Also the lower compression roller pair 320 consists of a pair of rollers which similarly rotate around a prescribed horizontal rotary axis, and the rollers are arranged to provide a narrower interval than in the upper compression roller pair 310.

Both the upper compression roller pair 310 and the lower compression roller pair 320 are set so as to rotate in directions opposite to each other in order to move sushi rice caused to flow forcedly between opposed rollers from the upstream side to the downstream side.

In this embodiment, the compression section 300 consists of two-high compression rollers. However, depending on specifications, the compression section 300 may consist of one-high compression rollers or may be of a multiple-high type. In the present invention, a concrete configuration of the hopper 200 and the compression section 300 is optional and the shape, arrangement and the like thereof may be capable of being optionally changed in accordance with specifications.

Figure 5A:
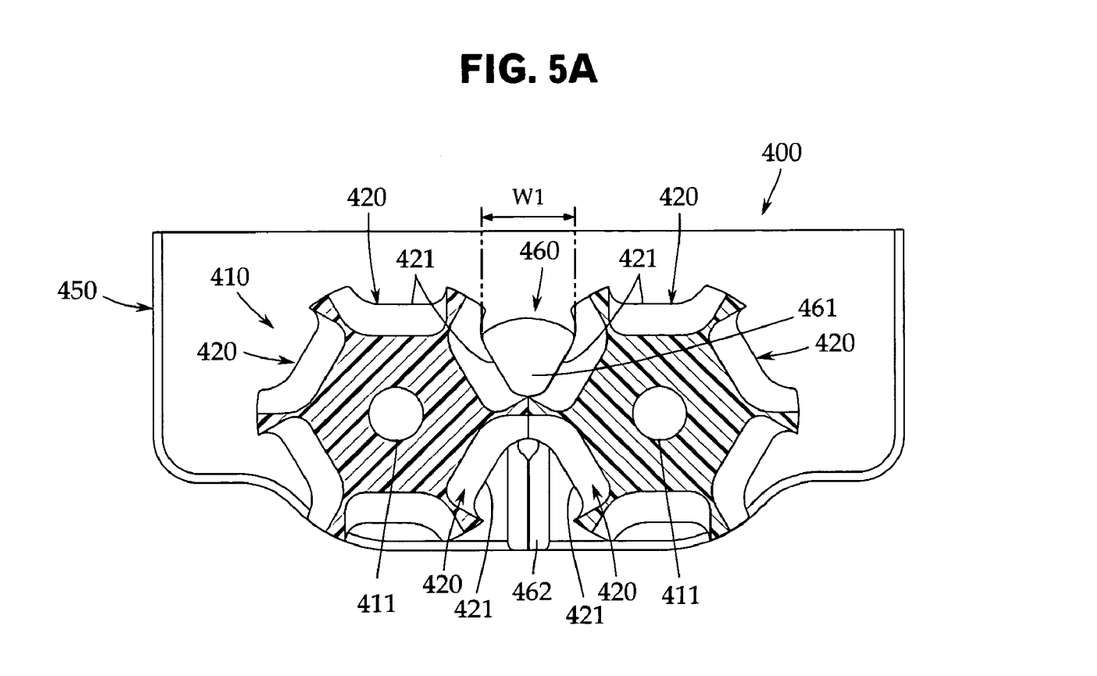
FIG. 5A is a cross-sectional view and FIG. 5B is a longitudinal sectional view of the forming section.
Figure 5B:
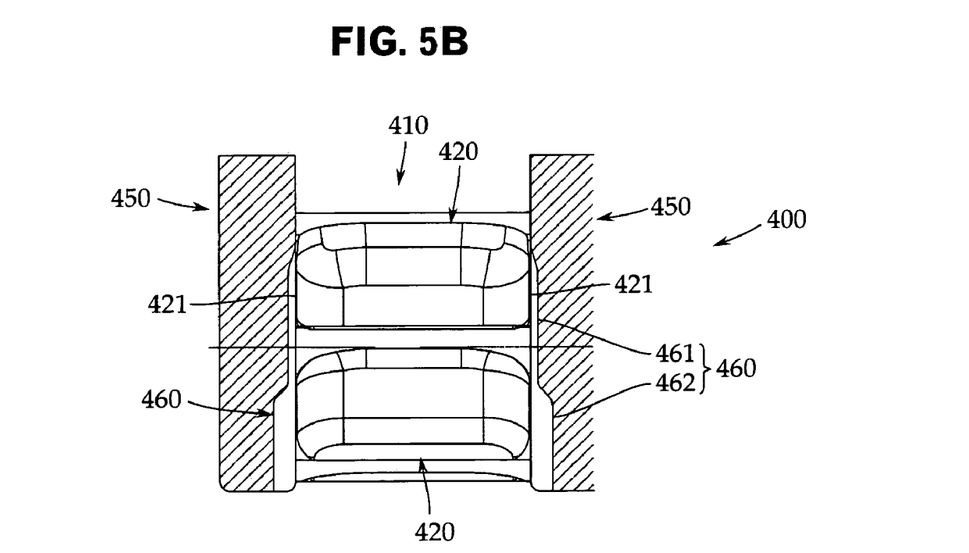

Referring to FIGS. 5A and 5B additionally, the forming section 400 is provided with a pair of forming rollers 410, 410 arranged on the downstream side of the compression section 300 and a pair of supporting panels 450, 450 which support both end surfaces 411, 411 of the forming rollers 410, 410 in the axial direction. The forming rollers 410, 410 have the same shape, are made of synthetic resin, and are designed to rotate synchronously in directions opposite to each other.

On an outer circumference of the forming roller 410, there is provided a concave molding surface 420 which forms the sushi rice fed into the forming section 400 into the rice ball 10. The concave molding surface 420 is formed from a concavity having a semi-cylindrical cross section and having a volume corresponding to substantially half the rice ball 10 from the outer surface to the center of the forming roller 410, and the concave molding surface 420 is provided at prescribed intervals in the circumferential direction of the forming roller 410, in this embodiment, in six places at intervals of 60 degrees.

Each of the forming rollers 410 is arranged in such a manner that circumscribed circles are in contact with each other, and end portions of the concave molding surfaces 420 mesh with each other. With this arrangement, the sushi rice caused to flow forcedly between the forming rollers 410 from the upstream side is filled into the concave molding surfaces 420, 420, compressed by the rotation of the forming rollers 410 in the concave molding surfaces 420, formed into a cylinder, and then discharged to the downstream side.

Both ends of the concave molding surface 420 (in the horizontal direction in FIG. 5B) are provided with notched portions 421, 421 which are open toward the end surface of the forming roller 410. The notched portions 421, 421 are openings smaller than the sectional area at the center of the concave molding surface 420 and part of the cooked rice compressed within the concave molding surface 420 is pushed out of the notched portions 421, 421.

The supporting panels 450, 450 are formed from plate bodies made of synthetic resin and are arranged along the axial end surfaces of the forming roller 410. The supporting panels 450 have the same shape and are arranged, with the forming roller 410 sandwiched therebetween, symmetrically with respect to the forming rollers 410. In the following, descriptions will be given by taking one of the supporting panels 450 as an example.

Figure 6A:
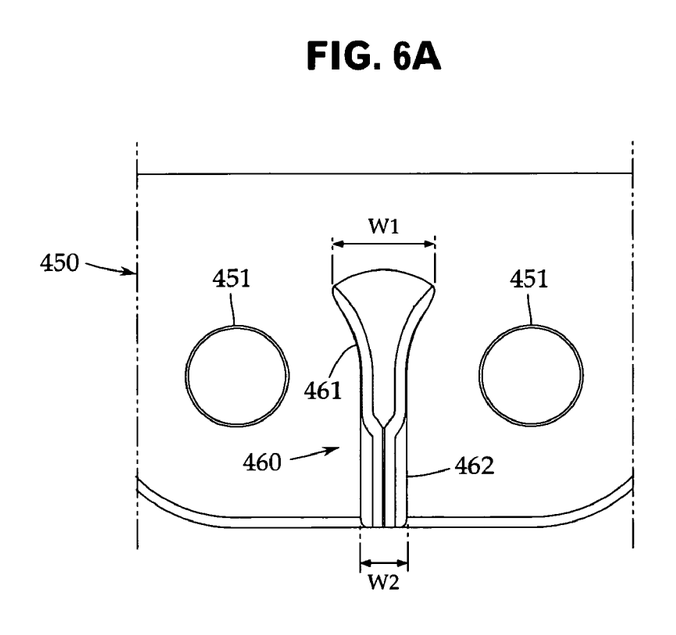
FIG. 6A is a front view of the guide portion and FIG. 6B is a sectional view of the central part of the guide portion.
Figure 6B:
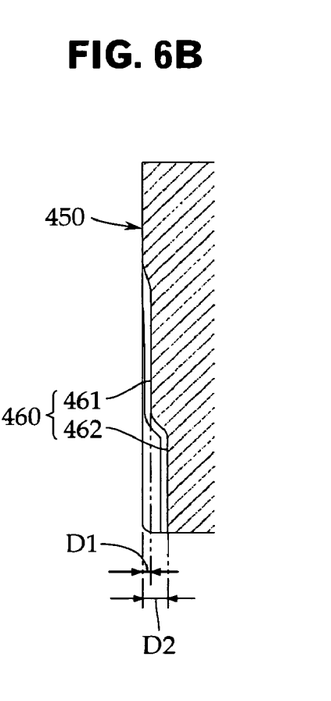

Referring to FIGS. 6A and 6B, in the supporting panel 450, shaft insertion holes 451, 451 into which the rotary shafts 411, 411 of the forming rollers 410, 410 are inserted are provided coaxially with respect to the rotary shafts 411, 411.

In the middle of the supporting panel 450, there is provided a guide portion 460 which receives cooked rice pushed out of the notched portion 421 of the concave molding surface 420 of the forming roller 410 and guides the cooked rice downstream. The guide portion 460 is composed of a guide groove which is dented from a surface (a surface opposed to the forming roller 410) of the supporting panel 450 to a prescribed depth. The guide portion 460 is coaxially formed along a vertical axis line whose center is an abutting surface of the forming rollers 410, 410.

The guide portion 460 is provided with two kinds of guide grooves 461, 462 having different depths. One guide groove (a first guide groove 461) has a width W1 on the start end side (the upper end side in FIG. 6A) corresponding to a maximum opening width between the concave molding surfaces 420 and a width W2 on the terminal end side (the lower end side in FIG. 6B) corresponding to a minimum opening width between the concave molding surfaces, and is formed in the shape of a fan which narrows gradually from the start end side to the terminal end side. The start end side of the first guide groove 461 has a tapered surface with a prescribed angle to facilitate the guiding of the cooked rice.

The other guide groove (the second guide groove 462) is a groove having an equal width whose upper end is connected to the terminal end of the first guide groove 461 and whose lower end is provided in an extending manner toward the lower end of the supporting panel 450. The first guide groove 461 and the second guide groove 462 have different groove depths, and a boundary portion between the two is formed to have a curved surface of a prescribed curvature so that the cooked rice is not caught.

The first guide groove 461 and the second guide groove 462 are formed to satisfy D2>D1, where the groove depth of the first guide groove 461 is D1 and the groove depth of the second guide groove 462 is D2. Incidentally, it is necessary only that the second guide groove 462 be formed deeper than the first guide groove 461, and concrete groove depths D1, D2 may be optionally set in accordance with specifications.

Although in this embodiment the first guide groove 461 and the second guide groove 462 are formed to satisfy D2>D1, it is preferred that the second guide groove 462 be formed to have a depth at which the second guide groove is not in contact with the formed cooked rice product.

Again referring to FIGS. 2 to 4, the conveyance section 500 is provided with a pair of holding arms 510, 510 which grasp a formed rice ball 10, arm opening and closing means 530 which opens and closes leading ends of the holding arms 510, 510, Z-axis moving means 550 which causes the holding arms 510, 510 to ascend and descent in a vertical direction (the Z-axis direction: the vertical direction in FIG. 3), and X-axis moving means 570 which moves the holding arms 510, 510 in a horizontal direction (the X-axis direction: the horizontal direction in FIG. 3).

The conveyance section 500 is such that a housing cover 501 in which the holding arm 510, the arm opening and closing means 530 and the Z-axis moving means 570 are built is arranged on the downstream side of the forming section 400, and the whole protective cover 501 is adapted to be moved horizontally by the X-axis moving means 570.

The storage section 600 is provided with a tray 610 on which a rice ball 10 is temporarily stored, and Y-axis moving means 630 which moves the tray 610 in the Y-axis direction. The tray 610 is a rectangular box body with an open upper surface formed from a molding of synthetic resin. The size and shape of the tray 610 may be optionally selected in accordance with specifications.

In the present invention, concrete configurations of the conveyance section 500 and the storage section 600 are optional and may be optionally changed in accordance with specifications so long as the forming section 400 of the present invention is provided.

Next, referring to FIGS. 1 to 8, a description will be given of an example of a procedure for using this cooked rice molding apparatus 100. First, after the storage container 230 in which sushi rice is charged is attached to an upper part of the hopper 200, the power switch is turned on. As a result of this switch operation, the stirring rod 240 of the hopper 200 starts rotating.

Next, after various items such as the amount of sushi rice and the number of rice balls 10 to be formed are set by operating the control panel 110, a work start button is operated. In response to the work start button, an unshown control section first performs the initialization of all mechanisms and makes checks as to whether no error signals have been outputted, whether the conveyance section 500 is in an initial position, and the like.

When the checking is completed, the control section causes each of the compression rollers 310, 320 of the compression section 300 to rotate, whereby the sushi rice delivered from the hopper 200 is conveyed to the upstream side of the forming section 400 while being compressed.

On ascertaining that the sushi rice has arrived at the upstream side of the forming section 400, the control section issues an instruction to the forming section 400, and causes the forming roller pairs 410, 410 of the forming section 400 to rotate in directions opposite to each other.

Figure 7A:
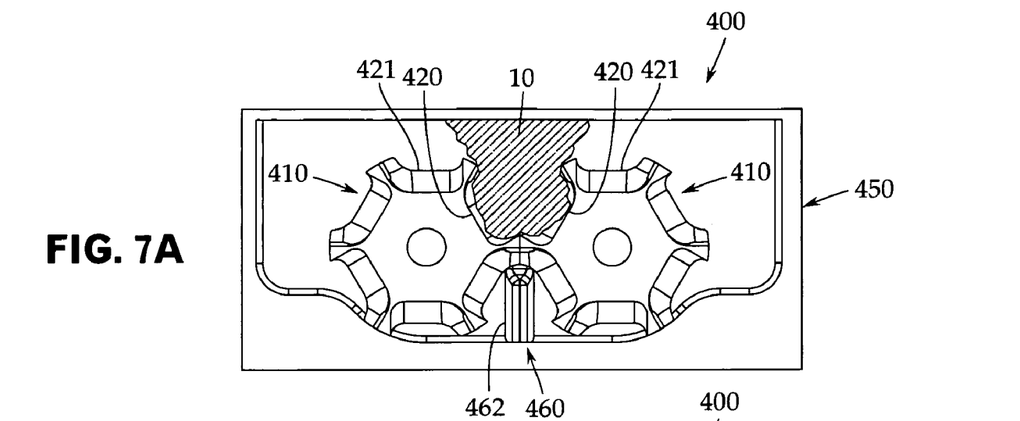
FIGS. 7A to 7C are front views schematically showing the forming procedure of the forming rollers.
Figure 8A:
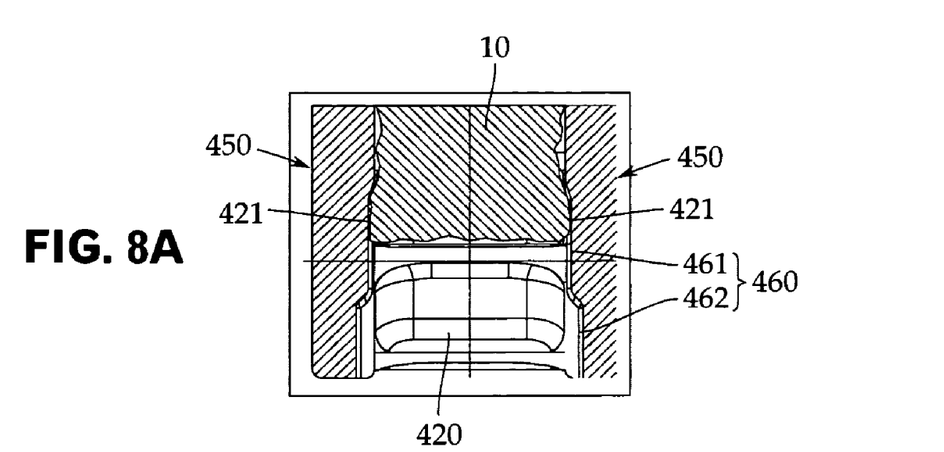
FIGS. 8A to 8C are longitudinal sectional views of the forming procedure of FIGS. 7A to 7C.
Figure 8B:
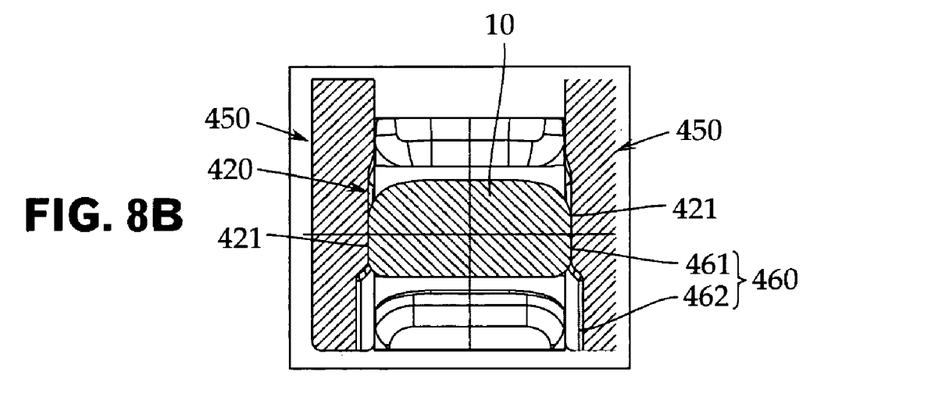

As the forming rollers 410, 410 rotate, as shown in FIGS. 7A and 8B, the sushi rice is taken between the concave molding surfaces 420, 420 of the forming roller pairs 410, 410 and the compression of a rice ball 10 is started.

As the forming roller pairs 410, 410 rotate, the sushi rice 10 enclosed within the concave molding surfaces 420, 420 becomes gradually compressed and part of the sushi rice 10 is pushed out of the notched portions 421, 421 at both ends.

Figure 7B:
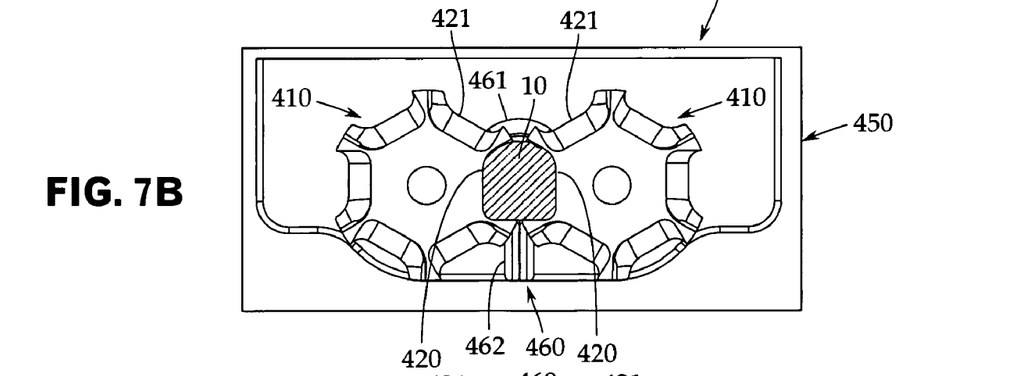

As shown in FIGS. 7B and 8B, the sushi rice 10 pushed out of the notched portion 421 is pushed against the first guide groove 461 and moves downward gradually as the forming rollers 410, 410 rotate. On that occasion, the sushi rice 10 is compressed toward the center by the first guide groove 461 formed in fan shape while moving downward.

According to this procedure, it is possible to cause the sushi rice 10 charged from the upstream side to flow smoothly into the first guide groove 461 and, therefore, the portion of the rice ball 10 pushed out sideward serves as a guide during the fall of the rice ball 10 and the direct advance stability and fall posture stability of the rice ball 10 are improved.

Figure 7C:
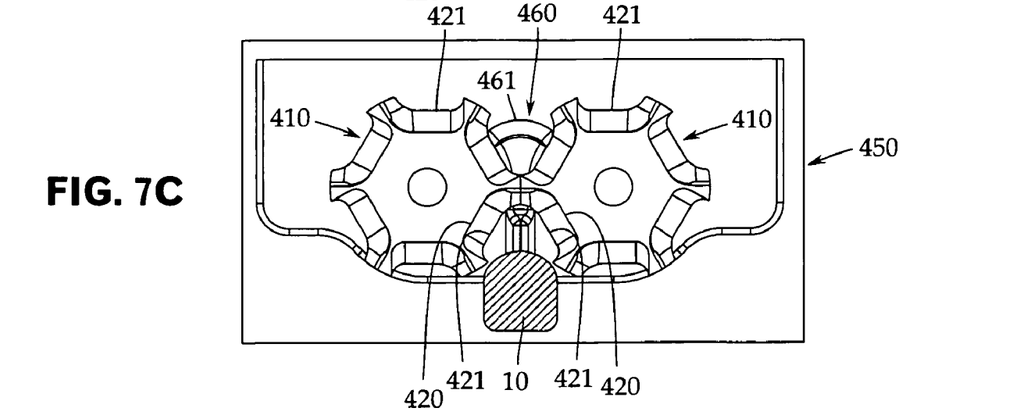
Figure 8C:
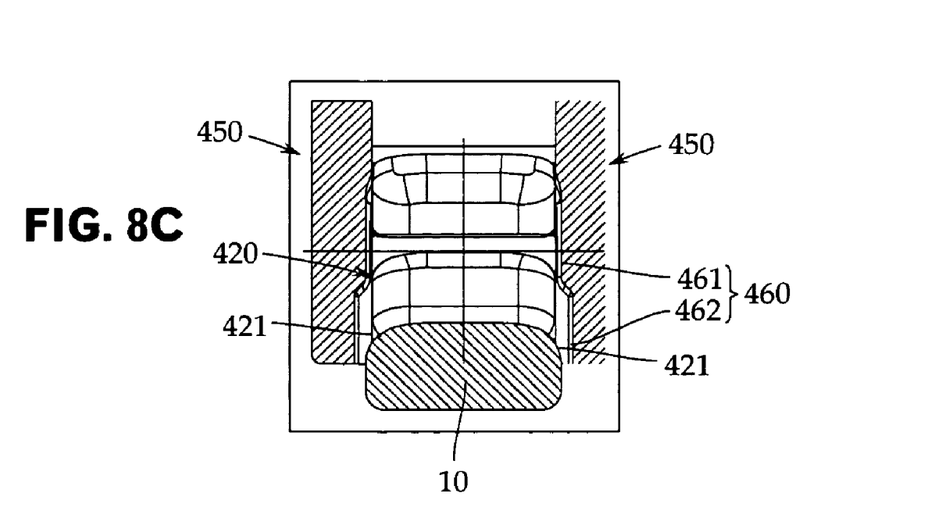

Next, as shown in FIGS. 7C and 8C, the forming rollers 410, 410 are further rotated, whereby the lower end side of the concave molding surfaces 420, 420 becomes open and the rice ball 10 compresses within the concave molding surfaces 420, 420 is released from the concave molding surfaces 420, 420 and falls.

On that occasion, the rice ball 10 falls without the abutment of the side surface of the rice ball 10 against the side surface of the second guide groove 462, whereby the rice ball 10 is prevented from inclining due to the catching of the side surface of the rice ball 10 and in case of posture losing, the second guide groove 462 prevents a great degree of posture losing.

The formed rice ball 10 slips from the concave molding surface 420 and is thrown down at the downstream conveyance section 500. The rice ball 10 thrown down at the conveyance section 500 is caught by the holding arms 510, 510 while maintaining a stable posture.

After ascertaining that the rice ball 10 has been caught by the holding arm 510, the control section first issues an instruction to the X-axis moving means 570 and causes the whole housing cover 501 including the holding arm 510 to move to a prescribed X-axis position of the tray 610.

After causing the housing cover 501 to move to a prescribed X-axis position, the control section next issues a descent instruction to the Z-axis moving means 550. After receiving the instruction, the Z-axis moving means 550 causes the holding arm 510 to descend by use of an unshown driving motor 554 and thereafter issues an "ARM-OPEN" instruction to the arm opening and closing means 530. The arm opening and closing means 530 opens the leading end of the holding arm 510 and releases the rice ball 10 onto the tray 610.

Thereafter, the control section issues an "ARM-MEDIUM POSITION" instruction to the arm opening and closing means 530. In response to this instruction, the arm opening and closing means 530 returns the holding arm 510 to a medium position. Furthermore, the control section issues an "INITIAL POSITION" instruction also to the Z-axis moving means 550, and the Z-axis moving means 550 lifts up the holding arm 510 to an initial position. Moreover, the control section issues a similar "INITIAL POSITION" instruction also to the X-axis moving means 570, and the X-axis moving means 570 returns the housing 501 of the conveyance section 500 to an initial position.

On ascertaining that rice balls 10 have been spread over the tray 610 in a specified quantity by repeating the above-described series of steps, the control section causes the tray 610 to move to a takeout position via the Y-axis moving means 600. After that, the control section returns the conveyance section 500 to an initial position and finally informs the worker that the forming work has been completed by using a buzzer or the like.

In the above-described embodiment, the case where the cooked rice molding apparatus 100 forms the rice ball 10 as a formed cooked rice product was taken as an example. However, the cooked rice molding apparatus 100 of the present invention may be applied to formed cooked rice products other than the rice ball 10 so long as the cooked rice molding apparatus 100 has the above-described features. Furthermore, the cooked rice molding apparatus of the present invention may also be applied to molding apparatus of various kinds of formed food products, such as croquettes and cookies.

The invention claimed is:

1. A cooked rice molding apparatus including a forming section which forms cooked rice supplied from a hopper into a formed cooked rice product with a prescribed shape while compressing the cooked rice, the forming section having a pair of forming rollers which rotate in directions opposite to each other around a horizontal rotary axis, there being provided a concave molding surface for forming the formed cooked rice product on an outer circumferential surface of each of the forming rollers, the cooked rice fed from an upstream side of the forming rollers being compression-formed within the concave molding surface and being discharged as the formed cooked rice product from a downstream side of the forming rollers,
wherein both ends of the forming roller have a pair of supporting panels,
the concave molding surface has, in a portion thereof, a notched portion open toward the end surfaces of the forming roller, and
each of the supporting panels is provided with a guide portion into which part of the cooked rice compressed within the concave molding surface and pushed out of the notched portion of the concave molding surface moves and which guides the formed cooked rice product from an upstream side to a downstream side.

2. The cooked rice molding apparatus according to claim 1, wherein the guide portion is formed from a guide groove obtained by denting part of the supporting panel, and the guide groove is formed along a vertical axis line passing through abutting surfaces of the forming rollers.

3. The cooked rice molding apparatus according to claim 1, wherein the guide portion is provided with a fan-shaped first guide groove whose upper-end-side width corresponds to a maximum opening width due to the notched portion between the concave molding surfaces and whose lower-end-side width corresponds to a minimum opening width due to the notched portion between the concave molding surfaces, the widths narrowing from an upstream side to a downstream side, and a second guide groove an end of which is connected to a lower end of the first guide groove and the other end of which is provided in an extending manner toward a lower end of the supporting panel.

4. The cooked rice molding apparatus according to claim 3, wherein the first guide groove and the second guide groove are formed to satisfy D2>D1, where D1 is the groove depth of the first guide groove and D2 is the groove depth of the second guide groove.

5. The cooked rice molding apparatus according to claim 4, wherein the second guide groove is formed to have a depth at which the second guide groove is not in contact with a side surface of the formed cooked rice product.

* * * * *